May 12, 1936. W. C. VINTEN 2,040,579
FADE-OUT SHUTTER MECHANISM FOR CINEMATOGRAPH CAMERAS
Filed April 6, 1934  3 Sheets-Sheet 1

INVENTOR
W. C. VINTEN
BY
ATTORNEY

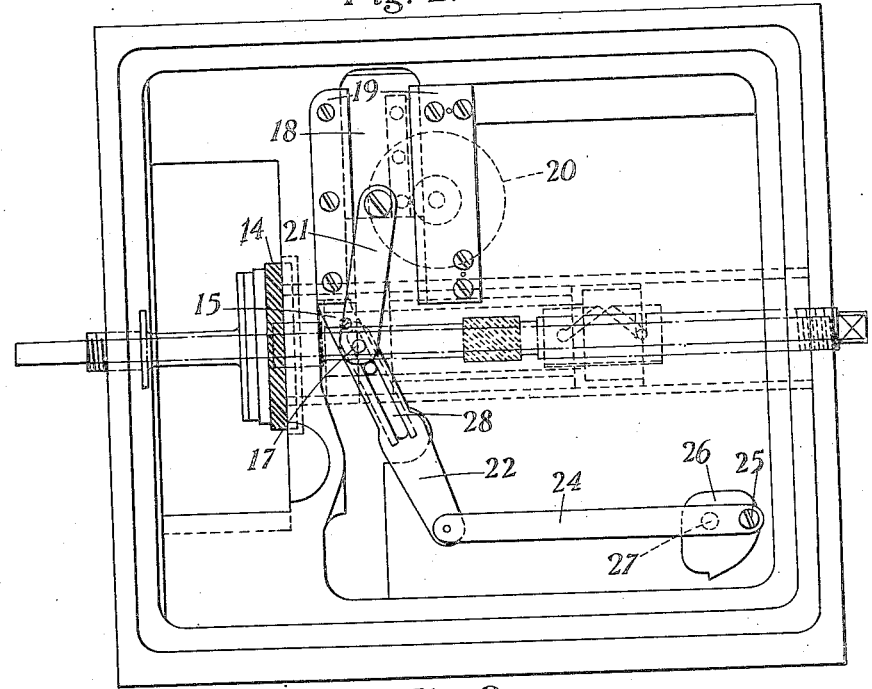
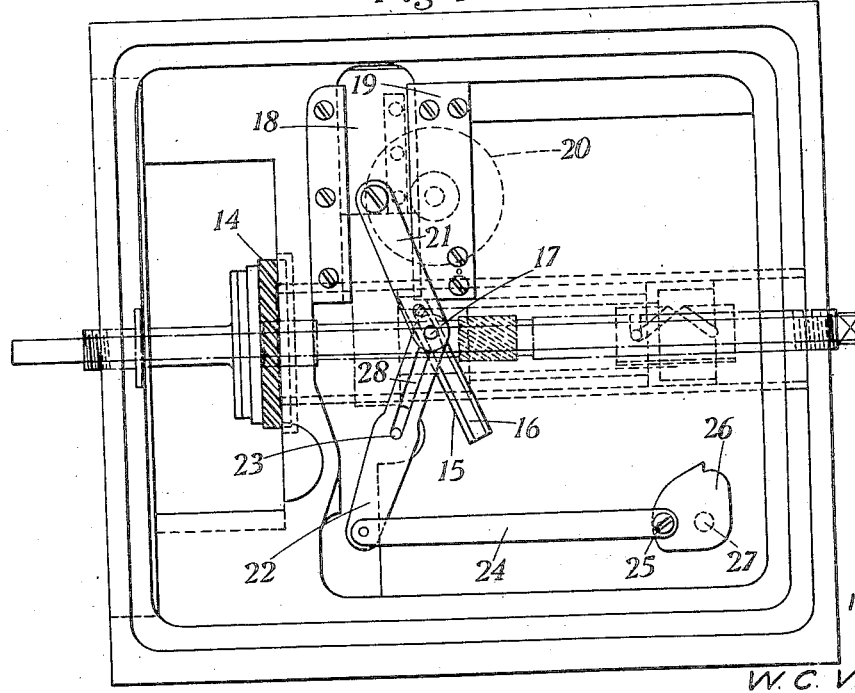

May 12, 1936.  W. C. VINTEN  2,040,579
FADE-OUT SHUTTER MECHANISM FOR CINEMATOGRAPH CAMERAS
Filed April 6, 1934   3 Sheets-Sheet 3

INVENTOR
W. C. VINTEN
BY
ATTORNEY

Patented May 12, 1936

2,040,579

UNITED STATES PATENT OFFICE 2,040,579

FADE-OUT SHUTTER MECHANISM FOR CINEMATOGRAPH CAMERAS

William Charles Vinten, London, England

Application April 6, 1934, Serial No. 719,387
In Great Britain October 9, 1933

7 Claims. (Cl. 88—19.3)

This invention relates to an improved method and means for controlling the supplementary shutter on a cinematograph camera, commonly called the "fade-out" shutter.

To produce the effect of "fading-out" or "fading-in", it is necessary for the exposure to be gradually decreased or increased, as the case may be, and this is accomplished by varying the effective size of the aperture in the intermittent shutter by means of a "fade-out" shutter which is rotated in relation to the intermittent shutter so as gradually to reduce the size of the aperture in "fading-out", and gradually to increase the aperture in "fading-in". These relative angular changes in the relation of the two shutters have to be accomplished while both shutters are revolving, and it is also desirable that the operator shall be able to adjust the aperture of the intermittent shutter from full opening—usually 170 degrees of arc—to anything less, as desired, any such adjustment remaining constant while the camera is running.

For proper action it is essential that the fade-out shutter should operate automatically during a predetermined footage of film run and that its operation should be manually controlled, so that it may function as and when desired. It is also desirable that the shutter should act during the same predetermined footage of film run whatever may be the aperture of the intermittent shutter with which the operator is working and further that it should be possible to reopen to full aperture after a mechanical fade-out has been effected, without running the camera.

The object of this invention is to provide a method and means of fade-out shutter operation whereby the above mentioned results are obtained without the employment of springs, whereby increased reliability of action is secured.

According to the invention, relative angular motion between the fade-out shutter and the main intermittent shutter, which varies the effective exposure aperture, is adapted to be positively adjusted by hand to give the required working aperture, and is also adapted to be automatically and positively adjusted between the limit set by hand adjustment and full closure in synchronism with the film feed, at a speed which varies according to the degree of hand adjustment, in such manner that a fade-out or fade-in always occupies the same footage of film whatever the working aperture. Preferably in order that a fade-out or fade-in shall always occupy the same film footage, whatever may be the working shutter aperture, hand operation of the mechanism for relatively rotating the shutters also varies the driving speed ratio between the shutter rotating mechanism and the film feed mechanism.

Further according to the invention, the mechanism includes as means for driving the shutters, a hollow shaft for one shutter, within which extends the shaft for the other shutter, in combination with adjustable means for drivingly associating said shafts together in different relative angular relations, said adjustable means including a sleeve longitudinally adjustable along the outer shaft, but rotating therewith, said sleeve having a helical groove in which engages a pin on the inner shaft which passes through a circumferential slot in the outer shaft.

The means for moving said sleeve longitudinally on the outer shaft may consist of a slotted arm fixedly associated with said sleeve, and a pin engaged in said slot and movable in the longitudinal direction of the shutter shafts by mechanism associated with a hand adjustment knob co-operating with an aperture scale. Said pin is also engaged with a slotted lever adapted to be rocked about a pivot by crank driven mechanism driven in synchronism with the film feed so as to be reciprocated between the position in which it has been set by hand adjustment and a position corresponding to full movement of the shutter adjusting sleeve, the rate of movement of the pin depending upon its position along the slotted lever, which position depends upon the setting of the hand adjustment mechanism for the shutter.

When the hand operated mechanism is set for full closure of the shutter aperture, the pin is coincident with the pivot of the slotted lever so that it is not moved thereby, notwithstanding continued operation of the film feed mechanism, and consequently no automatic operation of the shutter takes place. When the hand adjustment mechanism is set for full shutter aperture with the adjustment sleeve in one of its end positions, the pin is at the end of the slot remote from the pivot of the slotted lever, whereby the automatic shutter adjustment is effected over the full aperture range at the maximum speed of which the driving mechanism is capable.

In order that the invention may be clearly understood and readily carried into practice, appended hereto are three sheets of drawings illustrating the same, wherein:—

Figures 1, 2 and 3 are side elevations of the shutter adjustment driving mechanism in three different positions.

It is presupposed that the camera is provided with a hand or motor driven main shaft which drives through suitable gearing, firstly the intermittent and fade-out shutters, and secondly the film feed mechanism. It is also assumed that said main shaft may be coupled to a shaft driving the fading mechanism by means of a hand operated button or knob, the movement of which operates coupling means which automatically becomes disengaged after the fading mechanism shaft has turned through half a revolution.

Such driving arrangements are common in film cameras and it is usual for the coupling means between the fading mechanism shaft and the main drive to include two alternative gear trains of different ratios, either of which can be rendered operative by the control knob or button, to give a fade-out or fade-in, extending over different footages of film feed, as may be desired according to circumstances.

The present invention is only concerned with the actual fading mechanism operative between the fading mechanism drive shaft, which as indicated above only rotates half a revolution at a time as and when the fade control button or knob is operated, and the fade-out shutter becomes automatically operative.

Figure 4:
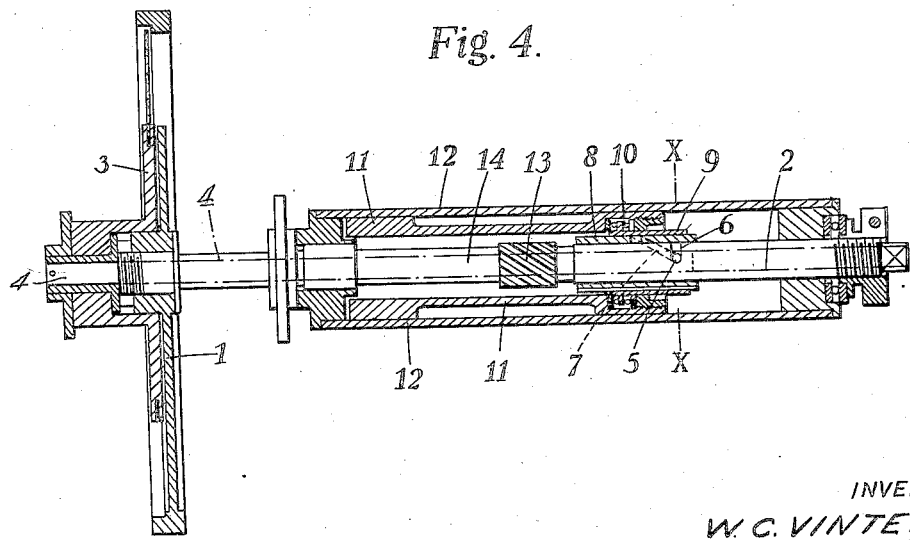
Figure 4 is a longitudinal section of the shutter adjustment mechanism proper.
Figure 5:
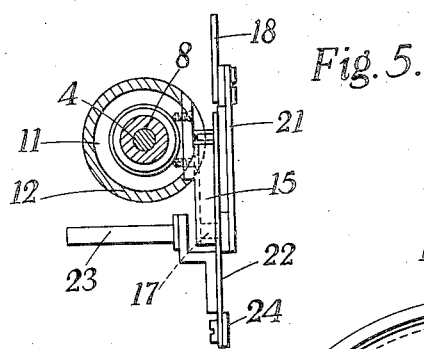
Figure 5 is a cross sectional view of the shutter adjustment mechanism with its associated driving mechanisms.
Figure 6:
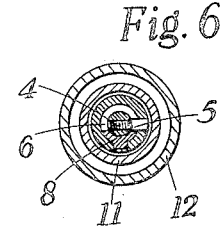
Figure 6 is a cross section of Figure 4 on the line X—X thereof.
Figure 7:
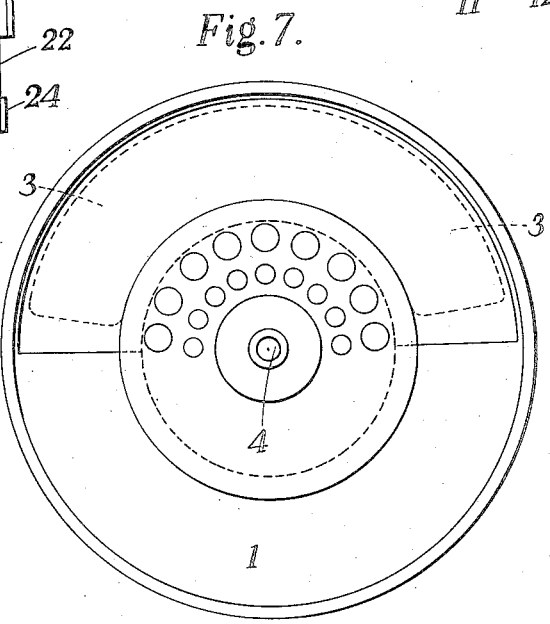
Figures 7 and 8 are views of the intermittent and fade-out shutters, in the closed and full aperture positions respectively.
Figure 8:
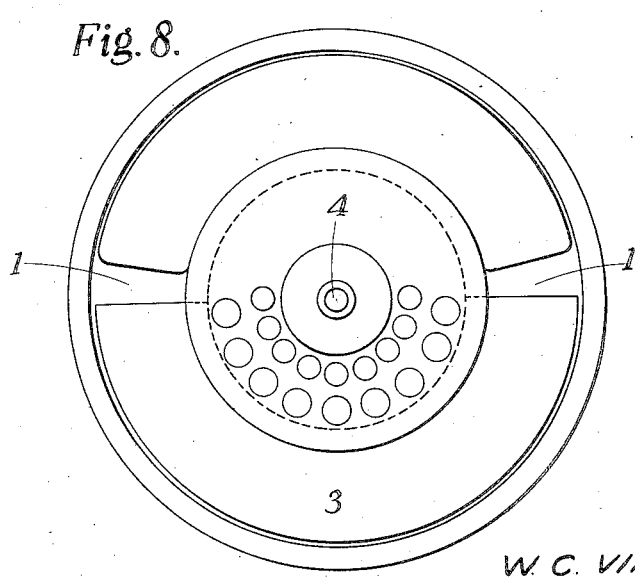

Referring now to Figure 4, the intermittent or main shutter 1 is mounted on a tubular shaft 2, and the fade-out shutter 3 on a shaft 4 passing axially through the shaft 2. The shaft 4 carries a radial pin 5 which passes through a part circumferential or straight slot 6 in shaft 2, and engages in a helical groove or slot 7 in a sleeve 8 which has a sliding key way connection (Figure 6) with shaft 2, permitting axial movement of the sleeve but preventing rotation thereof on shaft 2.

Sleeve 8 is mounted in a carrier sleeve 9 having a flange journalled in a ball thrust bearing 10 carried by an outer sleeve 11 surrounding the shaft 2. Outer sleeve 11 is a sliding fit in a tube 12 fixedly mounted in the camera casing, so that the shutters 1 and 3 and their shafts 2 and 4 are all supported by the tube 12.

By reason of the pin 5, straight slot 6 and groove 7, when outer sleeve 11 is moved axially along shaft 2, pin 5 travels along helical groove 7 and thus rotates shaft 4 within shaft 2, thus varying the relative angular positions of shutters 1 and 3. The outer sleeve 11 does not rotate, but owing to the ball thrust bearing 10, the inner adjustment sleeve 8 may move axially during rotation of shafts 1 and 3. The worm pinion 13 on tubular shaft 2 is driven from the main driving shaft of the camera through suitable gearing, the fixed tube 12 being cut away opposite pinion 13 for this purpose. The shaft 2 also carries a worm wheel 14 (Figures 1 to 4) from which the intermittent film feed mechanism is driven in any usual or convenient manner. The drive is communicated from shaft 2 to shaft 4 through sleeve 8 and pin 5.

For adjusting the outer adjustment sleeve 11 along tube 12 reference should be had to Figures 1, 2, 3 and 5. Along one side tube 12 is slotted to allow of the attachment to one end of adjustment sleeve 11 of an inclined arm 15 which has a longitudinal groove or slot 16 in which is engaged a pin 17, so that movement of said pin in the longitudinal direction of tube 12 will correspondingly move adjustment sleeve 11 within tube 12. The pin 17 may be thus operated in one of two ways, viz. the following:—

It may be adjusted by hand to vary the working size of the aperture, the mechanism shown in the drawings consisting of a vertical slide 18 which is moved along guides 19 by an external adjustment knob 20 through suitable rack and pinion mechanism. To the lower end of slide 18 is pivoted a link 21 the other end of which carries the aforesaid pin 17. It will thus be seen that as knob 20 is rotated slide 18 may be moved up and down, and pin 17 will consequently be moved axially in relation to tube 12 during its arcuate movement. The knob 20 co-operates with a scale of degrees of shutter opening—usually from 170 degrees to zero—so that by suitably setting knob 20, the working aperture of the shutter afforded by the differential setting of intermittent shutter 1 and fading shutter 3, can be set to any desired value from 170 degrees to fully closed position.

Figure 1:
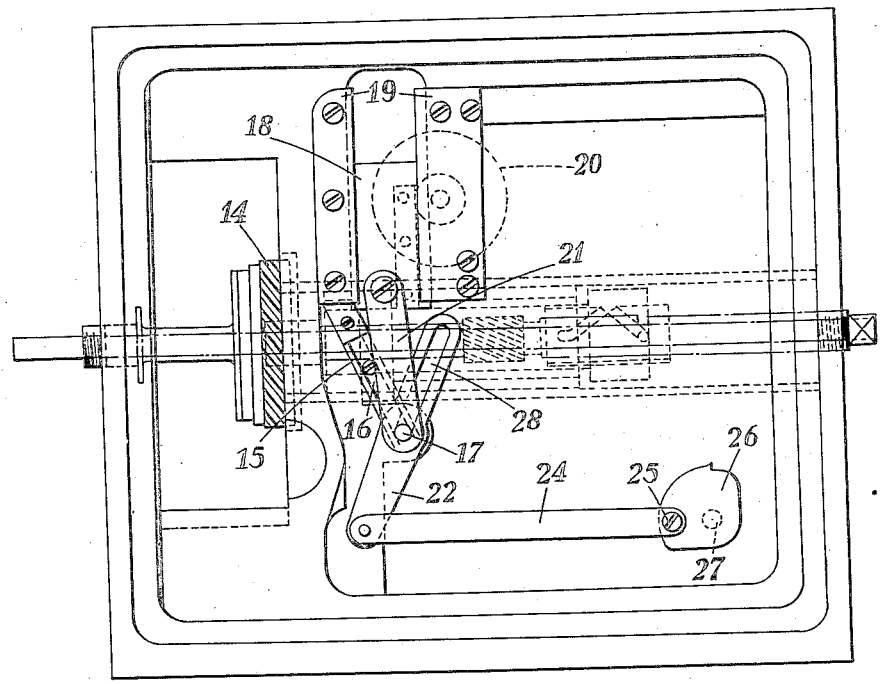

The full range of adjustment of knob 20 gives maximum axial movement of pin 17 along shafts 2 and 4, from the position shown in Figure 1 in which the shutters 1 and 3 are in fully closed position, to the position shown in Figure 2 in which the shutters are in fully open position. This maximum axial movement gives full traverse of sleeve 11 within tube 12 to an extent corresponding to the axial length of helical groove 7.

Thus by means of the hand control knob the shutter aperture can be varied from fully closed to fully open and any intermediate working aperture can be obtained as desired and indicated by the aperture scale associated with knob 20.

Secondly the pin 17 may be operated automatically by the lever 22 which is rocked about pivot 23 by connecting rod 24 connected to crank pin 25 carried by crank pin plate 26 mounted on fading mechanism shaft 27, which, as already indicated, is adapted to be rotated for half a revolution at a time, in synchronism with the film feed drive, whenever a fading control button or knob is operated. The pin 17 is engaged in a longitudinal slot 28 in lever 22, so that under certain conditions which will hereinafter appear, pin 17 will be traversed axially of tube 12 by rocking of lever 22.

It should be noted that as the slide 18 is adjusted the position of pin 17 along the slot 28 of lever 22 will vary from the extreme upper position shown in Figures 2 and 3 to the extreme lower position shown in Figure 1. In the latter position it is coaxial with pivot pin 23 of lever 22 and consequently rocking of lever 22 about said pivot will have no influence on pin 17. However, when pin 17 is at the upper end of slot 28, as in Figures 2 and 3, the leverage of lever 22 will be a maximum and pin 17 will be traversed axially in relation to tube 12. It will be clear that the further the distance of pin 17 from pivot pin 23, the greater will be the speed of the traversing movement.

Consequently the larger the shutter adjustment taken up by the hand control adjustment 18, 20, i. e. the smaller the working aperture for which the shutters are set, the lower down in slot 28 will be the pin 17 and the slower will be its automatic traversing movement to complete the shutter adjustment to fully closed position, whereas the larger the working aperture for which the shutters are set the greater is the amount of shutter adjustment left for automatic fading action and consequently the more rapidly does the pin 17 move in order to accomplish the fading action in the same footage of film as is occupied by a fading action accomplished from a smaller working aperture. This increased speed of movement of pin 17 is obtained, as will be appreciated, by increasing its distance from pivot 23 along slot 28.

In Figure 2 the hand adjustment is set for full working aperture but the mechanism is in the position occupied after a mechanical fade-out, the shutters therefore being in the non-exposure or closed position, in which the arm 15 and lever 22 occupy the same angular position.

In Figure 3 the mechanism is in the position occupied after a mechanical fade-in, the shutters being opened to the full working aperture permitted by the hand adjustment, this adjustment having been accomplished at a high working speed, as shown by the position of the pin 17 at the upper end of slot 28, due to the setting of hand adjustment 18, 20 to full working aperture or thereabouts.

In the case of Figure 1, although the lever 22 is in the position it occupies after a mechanical fade-in, operation of the fading mechanism will have no effect on the shutter opening since this is set by slide 18 and knob 20 to fully closed position, and the pin 17 being then in its unoperative position along slot 28.

From the foregoing description it will be appreciated that the shutters have a certain range of relative adjustment, part of which may be used in the initial setting of the shutters by hand to give the required working aperture, and the rest of which is left for automatic fading effects and the mechanism hereinbefore described provides for the automatic fading effect to take place at a speed proportional to the amount of adjustment which it has to accomplish, the smaller the adjustment possible, due to the use of a small working aperture, the smaller the speed of automatic adjustment, and vice versa. By this means the fading effect may be arranged to occupy the same film footage whatever range of shutter is available for automatic operation.

In order that after a mechanical fade-out has been accomplished, the shutters may be opened to the working aperture without running the camera, the fading shaft 27 is extended outside the camera casing and provided with an operating knob (not shown) by which it may be manually rotated, (when the fading control knob is moved into fade-in position, so that movement of the fading mechanism is possible) to move crank pin from the position shown in Figure 2 to that shown in Figure 3.

Since this is a reverse movement of the shaft 27, suitable ratchet mechanism is provided in the gearing included in the drive between the fading shaft 27 and the main driving shaft of the camera.

It should be noted that the shutter operating mechanism is entirely of a positively acting nature, whether operated by hand or mechanically, the action being in no way dependent upon springs with their liability to failure and to permit shutter creep during operation of the camera.

It should be understood that the invention is not limited to the specific embodiment hereinbefore described and illustrated, since many modifications may obviously be made and other constructions devised for carrying into practical effect the invention hereinafter defined in the appended claims.

What I claim is:—

1. In a cinema camera, a main intermittent shutter and an apertured fade shutter in juxtaposition, a tubular shaft carrying one of said shutters, a second shaft within the tubular shaft carrying the other shutter, means for rotating one of said shafts, means drivingly associating said two shafts together, manually operated means for angularly adjusting said shafts to vary the effective working aperture of the shutters without affecting the driving association of the shafts, and mechanism for automatically adjusting said shafts during rotation thereof, said mechanism including a driving shaft rotated by the camera drive mechanism, said mechanism including a variable throw crank device whereby the speed ratio of shaft adjustment to camera drive may be adjusted, and said manually operated means for varying the working aperture of the shutters being operatively associated with said mechanism to vary the throw of said crank device.

2. Fade-out shutter control mechanism for cinema cameras, comprising a main intermittent shutter, a co-axial fade-out shutter drivingly associated with the main shutter but angularly adjustable in relation thereto, manually adjustable means for relatively rotating said shutters to give the required working aperture, a shaft driven by the camera drive mechanism, a movable member for relatively adjusting the shutters between working aperture and fully closed positions, variable speed driving means between said shaft and said movable member, said manual shutter adjusting means also controlling the variable speed driving means of said member to adjust the speed ratio in relation to the said shaft proportionally to the working aperture, so as to operate said member with less speed at small working aperture than at large working aperture.

3. Fade-out shutter control mechanism for cinema cameras comprising a main intermittent shutter mounted on a driving shaft, a co-axial fade shutter mounted on another shaft, means drivingly associating said shafts together and permitting relative angular adjustment thereof, a sliding member for producing said angular adjustment, an arm carried by said sliding member, a pivoted rocking lever having a longitudinal slot engaged with a pin on said arm, means for adjusting the position of the pin along said slot, and means for coupling said rocking lever to a shaft driven by the camera drive mechanism, so as to oscillate said rocking lever intermittently backwards and forwards at will.

4. Fade-out shutter control mechanism for cinema cameras comprising a main intermittent shutter mounted on a driving shaft, a co-axial fade shutter mounted on another shaft, means drivingly associating said shafts together but permitting relative angular adjustment thereof, a sliding member for producing said angular adjustment, an arm carried by said sliding member, a pivoted rocking lever having a longitudinal slot engaged with a pin on said arm, means for adjusting the position of the pin along said slot, said means simultaneously moving said sliding member to set the shutters to working aperture, and means for coupling said rocking lever to a shaft driven by the camera drive mechanism, so as to oscillate said rocking lever intermittently backwards and forwards at will, and thus reciprocate the sliding member between its working aperture position and its aperture closed position.

5. A cinema camera including an intermittent shutter mounted on a shaft, driving mechanism for said shaft, an apertured fade-out shutter mounted in juxta-position to the main shutter on a tubular shaft surrounding the main shutter shaft, a pin on the inner shaft projecting through a part circumferential slot in the outer shaft, a sleeve slidable along the outer shaft and having an internal helical groove engaged with said pin, a non-rotating tube associated by a double thrust bearing with a flange on the sleeve, an inclined arm carried by said tube, a second pin carried by said arm, a link associated with said second pin, a slide associated with said link, a hand operated control knob adapted to move said slide and co-operating with a scale of apertures, a pivoted rocking lever having a longitudinal slot in which said second pin is engaged, a connecting rod connected to an arm of said rocking lever, a crank disc having a pin connection with said connecting rod, and a shaft driven by the camera drive mechanism and carrying said crank disc.

6. A cinema camera including an intermittent shutter mounted on a shaft, driving mechanism for said shaft, an apertured fade-out shutter mounted in juxtaposition to the main shutter on a tubular shaft surrounding the main shutter shaft, a pin on the inner shaft projecting through a part circumferential slot in the outer shaft, a sleeve slidable along the outer shaft and having an internal helical groove engaged with said pin, a non-rotating tube associated by a double thrust bearing with a flange on the sleeve, an inclined arm carried by said tube, a second pin carried by said arm, a link associated with said second pin, a slide associated with said link, a hand operated control knob adapted to move said slide and co-operating with a scale of apertures, a pivoted rocking lever having a longitudinal slot in which said second pin is engaged, and means drivingly associating said rocking lever with a shaft driven by the camera drive mechanism.

7. A cinema camera including an intermittent shutter mounted on a shaft, driving mechanism for said shaft, an apertured fade-out shutter mounted in juxta-position to the main shutter on a tubular shaft surrounding the main shutter shaft, a pin on the inner shaft projecting through a part circumferential slot in the outer shaft, a sleeve slidable along the outer shaft and having an internal helical groove engaged with said pin, a non-rotating tube associated by a double thrust bearing with a flange on the sleeve, an inclined arm carried by said tube, a second pin carried by said arm, a link associated with said second pin, a slide associated with said link and movable in a direction at right angles to the axis of said shutter shaft, a hand operated control knob adapted to move said slide and co-operating with a scale of apertures, a pivoted rocking lever having a longitudinal slot in which said second pin is engaged, and means drivingly associating said rocking lever with a shaft driven by the camera drive mechanism for reciprocation backwards and forwards.

WILLIAM CHARLES VINTEN.